US010229309B2

(12) United States Patent
Unveren et al.

(10) Patent No.: US 10,229,309 B2
(45) Date of Patent: Mar. 12, 2019

(54) BIOMETRIC CONTROL MEMBER

(71) Applicant: Dura Operating, LLC, Auburn Hills, MI (US)

(72) Inventors: Cumhur Unveren, Commerce Township, MI (US); Thomas Farges, Gometz le Chatel (FR)

(73) Assignee: DURA OPERATIONS, LLC, Auburn Hills, MI (US)

( * ) Notice: Subject to any disclaimer, the term of this patent is extended or adjusted under 35 U.S.C. 154(b) by 0 days.

(21) Appl. No.: 15/594,179

(22) Filed: May 12, 2017

(65) Prior Publication Data

US 2018/0330144 A1 Nov. 15, 2018

(51) Int. Cl.
*G06K 9/20* (2006.01)
*G06K 9/00* (2006.01)
*B60R 25/04* (2013.01)
*B60R 25/00* (2013.01)

(52) U.S. Cl.
CPC ........ *G06K 9/00087* (2013.01); *B60R 25/008* (2013.01); *B60R 25/04* (2013.01); *G06K 9/00013* (2013.01); *G06K 9/00926* (2013.01)

(58) Field of Classification Search
CPC ............................................ G06K 2009/00932
See application file for complete search history.

(56) References Cited

U.S. PATENT DOCUMENTS

| | | | |
|---|---|---|---|
| 6,100,811 A * | 8/2000 | Hsu | B60H 1/00642 340/426.36 |
| 7,171,026 B2 | 1/2007 | Shinada et al. | |
| 7,881,506 B2 | 2/2011 | Nagasaka et al. | |
| 8,805,028 B2 * | 8/2014 | Miura | G06K 9/00013 340/5.52 |
| 2002/0145535 A1 | 10/2002 | Flick | |
| 2003/0086588 A1 | 5/2003 | Shinada et al. | |
| 2004/0041689 A1 * | 3/2004 | DeBono | B60R 25/066 340/5.52 |
| 2006/0023919 A1 * | 2/2006 | Okamura | G06K 9/00362 382/115 |
| 2012/0050010 A1 | 3/2012 | Largue | |
| 2014/0125502 A1 | 5/2014 | Wittkop et al. | |
| 2015/0281214 A1 | 10/2015 | Shirai et al. | |
| 2016/0210504 A1 * | 7/2016 | Kim | G06K 9/00382 |
| 2017/0010675 A1 | 1/2017 | Lee et al. | |
| 2018/0054843 A1 * | 2/2018 | Stahlin | H04W 76/14 |

FOREIGN PATENT DOCUMENTS

| | | |
|---|---|---|
| EP | 1654984 A2 | 10/2006 |
| EP | 1764724 A2 | 3/2007 |

* cited by examiner

*Primary Examiner* — Brian Werner
(74) *Attorney, Agent, or Firm* — Robert E. Ford; Raymond J. Vivacqua; Steven L. Crane (57) ABSTRACT

A biometric recognition system for a vehicle includes a support portion, a vein reader sensor disposed on the support portion, and a control member configured to control a function of the vehicle. The control member has a top surface and a bottom surface and defines an opening extending through the control member from the top surface to the bottom surface. The control member is moveable relative to the support portion to a first position. The opening is aligned with the vein reader sensor and the top surface is a first distance from the vein reader sensor when the control member is in the first position. The first distance is configured to optimize biometric verification of an operator's hand gripping the control member.

23 Claims, 4 Drawing Sheets

BIOMETRIC CONTROL MEMBER

FIELD

The invention relates generally to a biometric control member for a vehicle, and more particularly to a biometric control member housing a palm vein sensor for performing operating functions in the vehicle.

BACKGROUND

The statements in this section merely provide background information related to the present disclosure and may or may not constitute prior art.

Motor vehicles have been designed with increasingly advanced technologies aimed at improving the safety, efficiency, and performance of the motor vehicle. An example of such technologies includes biometric control systems. Biometric control systems pair biometric sensors with vehicle functions, and vehicle-to-infrastructure (V2X) functions in order to improve ease of use/access to the vehicle. One example of a biometric control system is a fingerprint scanner used to unlock or turn on a vehicle. The fingerprint scanner senses or reads the fingerprint biometric data of a user. This biometric data is then compared to pre-registered biometric data to determine whether the user is authorized to operate the vehicle. However, fingerprint scanners may have trouble detecting the biometric data of the user due to limits in the technology. Another type of biometric sensor is the vein reader sensor which detects the vein pattern of a user. The vein reader sensor is typically more reliable and faster than a fingerprint sensor. However, the vein reader sensor uses infrared emissions and reflections and thus requires a specific distance between the sensor and the operator's hand. Accordingly, there is a need in the art to provide a biometric control system that utilizes vein reader sensor technology that functions with vehicle design requirements.

SUMMARY

In one aspect of the present disclosure a biometric recognition system for a vehicle includes a support portion, a vein reader sensor disposed on the support portion, and a control member configured to control a function of the vehicle. The control member has a top surface and a bottom surface and defines an opening extending through the control member from the top surface to the bottom surface. The control member is moveable relative to the support portion to a first position. The opening is aligned with the vein reader sensor and the top surface is a first distance from the vein reader sensor when the control member is in the first position. The first distance is configured to optimize biometric verification of an operator's hand gripping the control member.

In another aspect of the present disclosure the first distance between the operator's hand and the vein reader sensor is free from material.

In yet another aspect of the present disclosure the first distance is approximately 70 mm.

In yet another aspect of the present disclosure the opening is configured to allow the vein reader sensor to sense at least a portion of the operator's hand.

In yet another aspect of the present disclosure the opening has a width and a length of at least 40 mm each.

In yet another aspect of the present disclosure the vein reader sensor senses through the opening a biometric vein image of only a portion of the operator's hand on the control member.

In yet another aspect of the present disclosure the control member includes a palm rest, and the opening is disposed in the palm rest.

In yet another aspect of the present disclosure the palm rest is an elevated platform extending above and parallel to a plane defined by the vein reader sensor.

In yet another aspect of the present disclosure the vein reader sensor is in communication with a controller having memory for storing a biometric template, and the controller is configured to compare the biometric vein image from the vein reader sensor to the biometric template to activate at least one function if the sensor data matches the biometric template.

In yet another aspect of the present disclosure the function includes unlocking the control member to allow the control member to move to a second position.

In yet another aspect of the present disclosure the function includes enabling an ignition of the vehicle.

In yet another aspect of the present disclosure the function includes activating one or more operator preferences associated with the biometric template.

In yet another aspect of the present disclosure the control member is a shifter, and the shifter is translatable in a longitudinal direction between at least a Park position, a Neutral position, a Reverse position, and a Drive position, and the first position corresponds to the Park position.

In yet another aspect of the present disclosure a biometric recognition system for a vehicle includes a control member having an outer surface with a tactile portion configured to be manipulated by an operator's hand, the tactile portion having an opening. The control member is operable between a Park mode and a Drive mode. A vein reader sensor is disposed at a distance from the opening in the tactile portion when the control member is in the Park mode, and the vein reader sensor senses a biometric vein image of a portion of the operator's hand on the tactile portion of the control member. A controller is in communication with the vein reader sensor and has memory for storing a biometric template. The controller is configured to compare the biometric vein image from the vein reader sensor to the biometric template to activate at least one function if the biometric vein image matches the biometric template.

In yet another aspect of the present disclosure the vein reader sensor senses though the opening a biometric vein image of only a portion of the operator's hand on the tactile portion of the control member.

In yet another aspect of the present disclosure the function includes unlocking the control member to allow the control member to move from the Park mode to the Drive mode.

In yet another aspect of the present disclosure the function includes enabling an ignition of the vehicle.

In yet another aspect of the present disclosure the function includes activating one or more operator preferences associated with the biometric template.

In yet another aspect of the present disclosure the function includes a V2X function.

In yet another aspect of the present disclosure a biometric system for use with a motor vehicle includes a biometric enrollment apparatus external to the motor vehicle. The biometric enrollment apparatus has a first vein reader sensor, the first vein reader sensor having a first scanning resolution and being in communication with a remotely accessible database for storing a biometric template of an operator's entire palm. A biometric recognition system is disposed in the motor vehicle and in communication with the remotely accessible database. The biometric recognition system includes a control member having an outer surface with a tactile portion configured to be manipulated by an operator's hand; the tactile portion having an opening. The control member is operable between a Park mode and a Drive mode. A second vein reader sensor is disposed at a distance from the opening in the tactile portion when the control member is in the Park mode. The second vein reader sensor senses a biometric vein image of a portion of the operator's hand on the tactile portion of the control member. A controller is in communication with the second vein reader sensor and has memory for storing the biometric template. The controller is configured to compare the biometric vein image from the second vein reader sensor to the biometric template to activate at least one function if the biometric vein image matches the biometric template. The at least one function includes unlocking the control member body to allow the tactile portion to be operated, enabling an ignition of the vehicle, or activating one or more operator preferences associated with the biometric template.

Further aspects, examples, and advantages will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views.

DETAILED DESCRIPTION

The following description is merely exemplary in nature and is not intended to limit the present disclosure, application or uses.

Figure 1A:
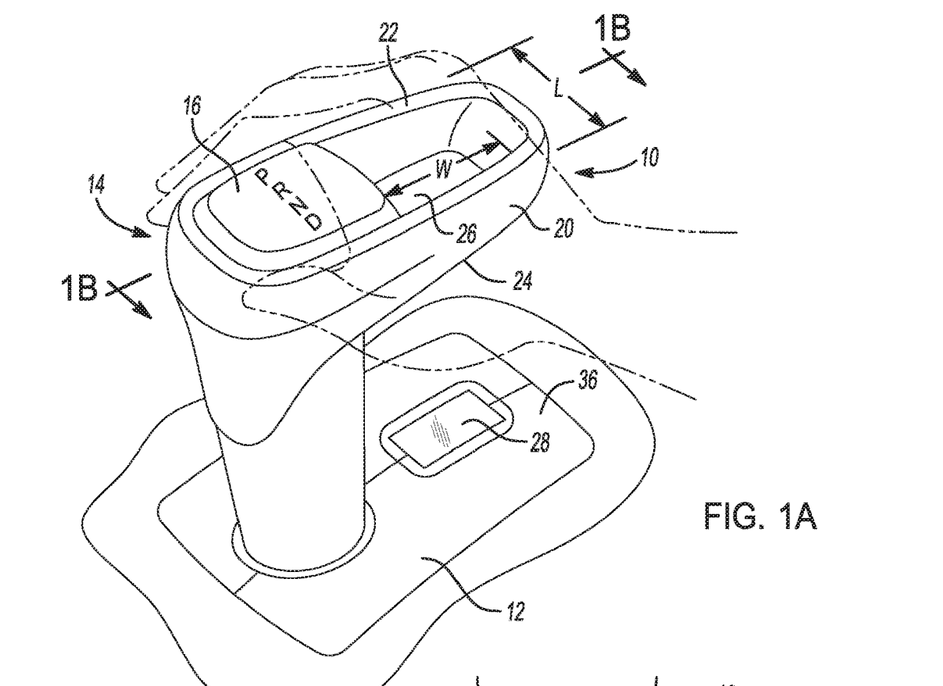
FIG. 1A is a perspective view of an example of a biometric control member according to the principles of the present disclosure.
Figure 1B:
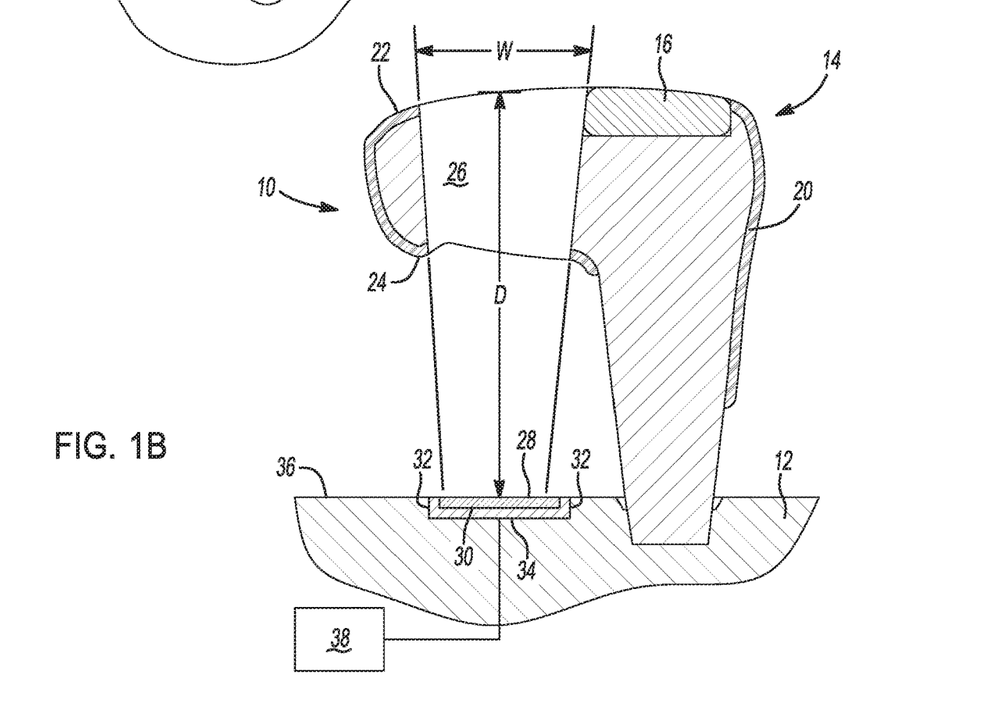
FIG. 1B is a cross-sectional front view taken along section line 1B-1B of an example of the biometric control member of FIG. 1A according to the principles of the present disclosure.

With reference to FIG. 1A-1B, a first example of a biometric control system or member according to the principles of the present disclosure is shown and generally indicated by reference number 10. The biometric control member 10 is preferably used in a vehicle, for example a passenger vehicle, truck, sport utility vehicle, van, motor home, or any other type of vehicle without departing from the scope of the present disclosure. In one aspect, the biometric control member 10 is operable to shift the motor vehicle between various operating modes. For example, the biometric control member 10 is operable to shift between Park, Reverse, Neutral, and Drive. However, it should be appreciated that the biometric control member 10 may be able to shift the vehicle into other operating modes, for example, manual modes and/or high gear and low gear operating modes, without departing from the scope of the present disclosure. The biometric control member 10 is mounted within the passenger compartment of the vehicle, typically in the dashboard instrument panel or center console, so as to be accessible by an operator of the vehicle. The biometric control member 10 includes a base portion 12 and a control member 14. The base portion 12 is mounted to the vehicle and the control member 14 is moveable relative to the base portion 12. For example, control member 14 extends out from the base portion 12 and is movable with respect to the base portion 12, by pivoting, translating, or any combination thereof. The biometric control member 10 includes an indicator panel 16 that indicates in which operating mode control member 14 is currently engaged. In several aspects, the indicator panel 16 may be disposed on control member 14, on the base portion 12, or in any number of other locations within the motor vehicle and visible to the motor vehicle operator.

The control member 14 includes an arm 18 and a grip or tactile portion 20 that is sized to be gripped by the hand of an operator of the vehicle. The grip portion 20 is disposed at the distal end of the arm 18. In one aspect, the grip portion 20 is an elevated platform extending above and parallel to a plane defined by the base portion 12. The grip portion 20 is defined by an upper surface 22 and a lower surface 24. An opening 26 is disposed in the grip portion 20 passing through the upper surface 22 and the lower surface 24. The opening 26 is free of any material and has a longitudinal length "L" and a transverse width "W."

A biometric sensor 28 is disposed on or in the base portion 12. In one aspect, the biometric sensor 28 is disposed in a chamber or recess 30 in the base portion 12. The chamber 30 is free of any material and is defined by four planar side walls 32 (three of which are shown), and a bottom surface 34. In one aspect, the biometric sensor 28 is disposed on the bottom surface 34 of the chamber 30 and is substantially flush with an outer surface 36 of the base portion 12. In another aspect, the biometric sensor 28 may be below the outer surface 36 of the base portion 12. Alternatively, the biometric sensor 28 may be disposed directly on the outer surface 36 of the base portion 12.

The biometric sensor 28 is disposed adjacent the arm 18 and below the opening 26. In one aspect, the biometric sensor 28 is aligned with the opening 26 of the control member 14 when the control member 14 is in the Park position. The biometric sensor 28 is a distance "D" from an imaginary plane that is coplanar with the upper surface 22 of the grip portion 20. The distance "D" is selected to optimize the capability of the biometric sensor 28 to sense biometric data at approximately the distance D. In one aspect, the distance "D" is approximately 70 mm. In one aspect, the dimensions of opening 26 are selected such that the biometric sensor 28 senses a portion of the operator's hand. In the example in which "D" is approximately 70 mm, the opening 26 is free of any material and has a longitudinal length "L" and a transverse width "W." In the example, the length "L" and width "W" of the opening are each at least 40 mm. In another example, the length "L" and width "W" of the opening are each at least 100 mm.

The biometric sensor 28 is preferably a vein reader sensor that emits infrared radiation and detects reflected radiation. In one aspect, the biometric sensor 28 has a substantially square shape with a length and width of approximately 30 mm, and a depth of approximately 13 mm. The biometric sensor 28 is in electronic communication with a controller 38. The controller 38 may be packaged with the biometric control member 10 or be a vehicle control module, such as a body control module, engine control module, transmission control module, etc. Generally, the controller 38 is a non-generalized, electronic control device having a preprogrammed digital computer or processor, memory or non-transitory computer readable medium used to store data such as control logic, instructions, lookup tables, biometric data, driver preferences, etc., and a plurality of input/output peripherals or ports. The processor is configured to execute the control logic or instructions. The controller 38 is configured to execute, or command/request execution of, various functions within the vehicle based on biometric data sensed by the biometric sensor 28. The functions may include, for example, starting the motor vehicle, unlocking the grip portion 20 for movement out of park, activating driver preferences related to seat position, side view mirror position, and so forth. In several aspects, the functions may include vehicle-to-vehicle or vehicle-to-infrastructure (V2X) functions.

For example, when an operator of the vehicle grips the grip portion 20, the operator's palm is disposed overtop the opening 26. The grip portion 20 keeps the palm at approximately the distance D, thereby optimizing the ability of the biometric sensor 28 to sense the biometric data. The biometric sensor 28 wakes from a sleep mode and scans and detects the vein pattern of the operator's palm or fingers. The sensed vein pattern is then digitized as a template of biometric data and compared to stored biometric data templates associated with authorized operators of the vehicle. If there is a template match the controller 38 commands one or more functions. If there is not a template match the controller 38 sends an identification fail command to the vehicle, and various vehicle functions are rendered inaccessible.

Figure 2A:
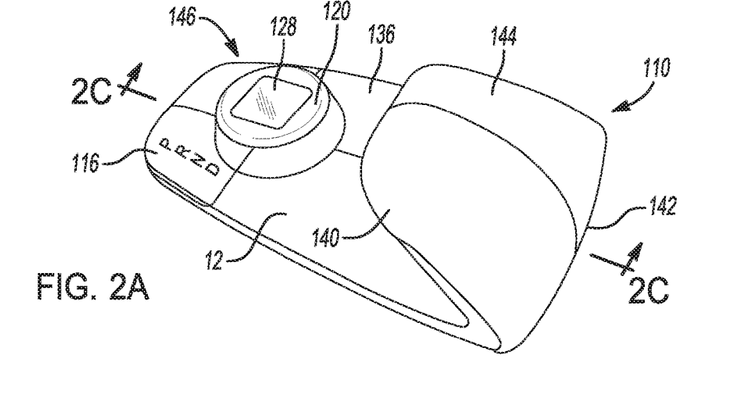
FIG. 2A is a perspective top view of an example of a biometric control member according to the principles of the present disclosure.
Figure 2B:
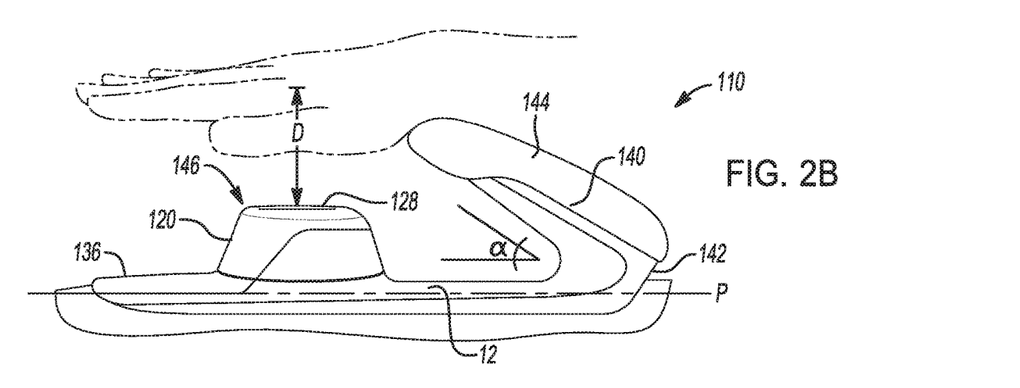
FIG. 2B is a side view of an example of a biometric control member according to the principles of the present disclosure.
Figure 2C:
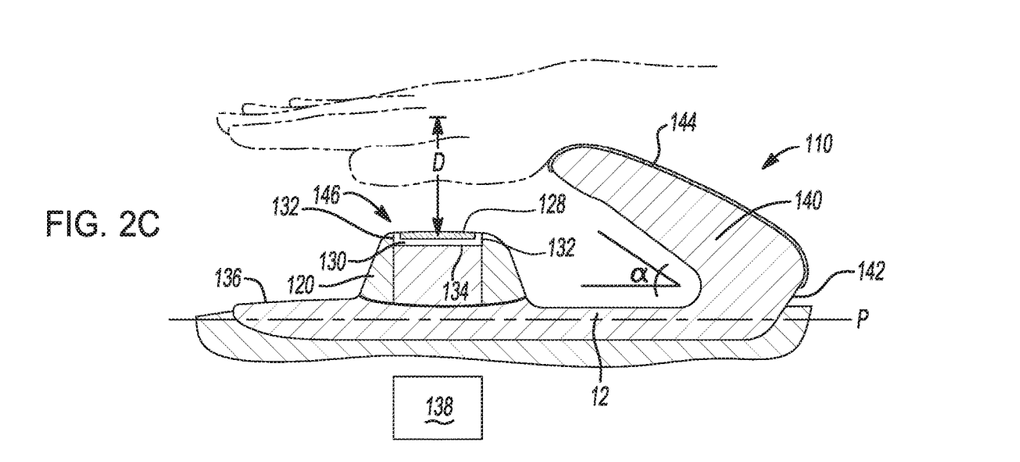
FIG. 2C is a cross-sectional side view taken along section line 2C-2C of FIG. 2A of an example of a biometric control member according to the principles of the present disclosure.

Turning now to FIGS. 2A-2C, another example of a biometric control member according to the principles of the present disclosure is indicated by reference number 110. The biometric control member 110 is similar to the biometric control member 10 and therefore, like components are indicated by like reference numbers, but increased by 100. The biometric control member 110 includes base portion 112 having an outer surface 136 with a tactile portion or grip portion 120. The base portion 112 is mounted within the passenger compartment of the vehicle, typically in the dashboard instrument panel or center console, so as to be accessible by an operator of the vehicle. The grip portion 120 extends out of an imaginary plane "P" defined by the base portion 112. The biometric control member 110 includes an indicator panel 116 that indicates in which operating mode the biometric control member 110 is currently engaged. In several aspects, the indicator panel 116 may be disposed on the grip portion 120, on the base portion 112, or in any number of other locations within the motor vehicle and visible to the motor vehicle operator.

The base portion 112 defines a chamber or recess 130 within the base portion 112. The chamber 130 is free of any material and is defined by four planar side walls 132, and a bottom surface 134. In one aspect, the planar side walls 132 are angled with respect to the bottom surface 134. In another aspect, the planar side walls 132 are substantially orthogonal to the bottom surface 134. A biometric sensor 128 is disposed within the chamber 130 of the base portion 112. In one aspect the biometric sensor 128 may be disposed directly on the outer surface 136 of the base portion 112. Alternatively, the biometric sensor 128 is disposed on the bottom surface 134 of the chamber 130 and is substantially flush with the outer surface 136 of the base portion 112. In another aspect, the biometric sensor 128 may be below the outer surface 136 of the base portion 112. In a further aspect, a transparent cover or window (not shown) is disposed overtop the chamber 130 of the base portion 112. The window is transparent to at least infrared radiation.

The biometric sensor 128 is preferably a vein reader sensor that emits infrared radiation and detects reflected radiation. In one aspect, the biometric sensor 128 has a substantially square shape with a length and width of approximately 30 mm, and a depth of approximately 13 mm. The biometric sensor 128 is in electronic communication with a controller 138. The controller 138 may be packaged with the biometric control member 110 or be a vehicle control module, such as a body control module, engine control module, transmission control module, etc. Generally, the controller 138 is a non-generalized, electronic control device having a preprogrammed digital computer or processor, memory or non-transitory computer readable medium used to store data such as control logic, instructions, lookup tables, biometric data, driver preferences, etc., and a plurality of input/output peripherals or ports. The processor is configured to execute the control logic or instructions. The controller 138 is configured to execute, or command/request execution of, various functions within the vehicle based on biometric data sensed by the biometric sensor 128. The functions may include, for example, starting the motor vehicle, unlocking the grip portion 120 for movement out of park, activating driver preferences related to seat position, side view mirror position, and so forth. In several aspects, the functions may include vehicle-to-vehicle or vehicle-to-infrastructure (V2X) functions.

With continued reference to FIGS. 2A-2D, the base portion 112 further includes a support portion 140 extending from the base portion 112. The support portion 140 extends out of imaginary plane "P" defined by the base portion 112 at an angle "α" from imaginary plane "P," and towards the grip portion 120 from a first end 142 of the base portion 112. The support portion 140 provides support for the operator's wrist or arm. The angle α at which the support portion 140 extends is chosen to improve the ability of the biometric sensor 128 to read biometric information from the operator. In one aspect, the angle α at which the support portion 140 extends is approximately 30°-45° above the imaginary plane "P." Accordingly, the support portion 140 supports the operator's wrist or arm in a manner that aligns the operator's palm with the biometric sensor 128 disposed in the grip portion 120. While the support portion 140 is described above as extending up and out of the imaginary plane "P" at angle "α" where "α" is between 30° and 45°, it should be understood that the support portion 140 may be any protrusion from the base portion 112 that extends above "P" and supports the operator's wrist or arm in a manner that optimally aligns the operator's palm with the biometric sensor 128. For example, the support portion 140 may be a vertical post or shelf-like protrusion from the base portion 112 that supports the operator's wrist or arm such that the operator's palm is optimally aligned with the biometric sensor 128. In a further example, the support portion 140 supports the operator's wrist or arm such that the operator's palm is both substantially parallel to the biometric sensor 128 and supported at approximately distance "D" from the biometric sensor 128. Distance "D" is selected to optimize the capability of the biometric sensor 128 to sense biometric data at approximately the distance D. In one aspect, the distance "D" is approximately 70 mm.

To improve operator comfort, a pad 144 covers at least a portion of the support portion 140. As shown in FIGS. 2A-2C, the pad 144 substantially entirely covers the operator-facing surface of the support portion 140. However, while the support portion 140 is described as including a pad 144, it should be understood that depending on the application, the biometric control member 110 may have a size, shape, location, and arrangement within the automobile in which the inclusion of a pad 144 is not desirable. Furthermore, it should be understood that while in the examples of FIGS. 2A-2C, the biometric control member 110 is depicted as a component for an automobile center console, the biometric control member 110 may be disposed in the interior of a motor vehicle in a number of other locations, such as the dashboard instrument panel, steering column, steering wheel, door handle, etc., without departing from the scope or intent of this disclosure.

The biometric control member 110 is operable between a locked and an unlocked configuration. In an example in which the biometric control member 110 is a rotary shift knob 146 for an automobile transmission, in the locked configuration, the grip portion 120 will refuse to accept certain inputs from the motor vehicle operator. In the unlocked configuration, the grip portion 120 is free to receive and respond to commands from the motor vehicle operator. In one example, the grip portion 120 is rotatable relative to the base portion 112 and the biometric sensor 128, and receives rotary inputs from an operator of the vehicle. That is, while the grip portion 120 the window (not shown) may rotate, the biometric sensor 128 remains stationary relative to the base portion 112, and does not rotate. In another example, the grip portion 120 includes a plurality of capacitive touch features, mechanical buttons, or the like (hereinafter touch-sensitive buttons) for receiving inputs from an operator of the vehicle. In the locked configuration, the rotary grip portion 120 and/or the touch-sensitive buttons, will refuse to accept operator inputs, while in the unlocked configuration, the opposite will be true. While the biometric control member 110 is described above as being a rotary shift knob 146 for an automobile transmission, it should be appreciated that the locked and unlocked configurations of the biometric control member 110 as described above are similarly applicable to biometric control members 110 that may control other aspects of the motor vehicle. For example, locked and unlocked configurations may apply to driver assistance feature settings, audio-visual settings, V2X operations, and a variety of other functions without departing from the scope or intent of the present disclosure.

Figure 3:
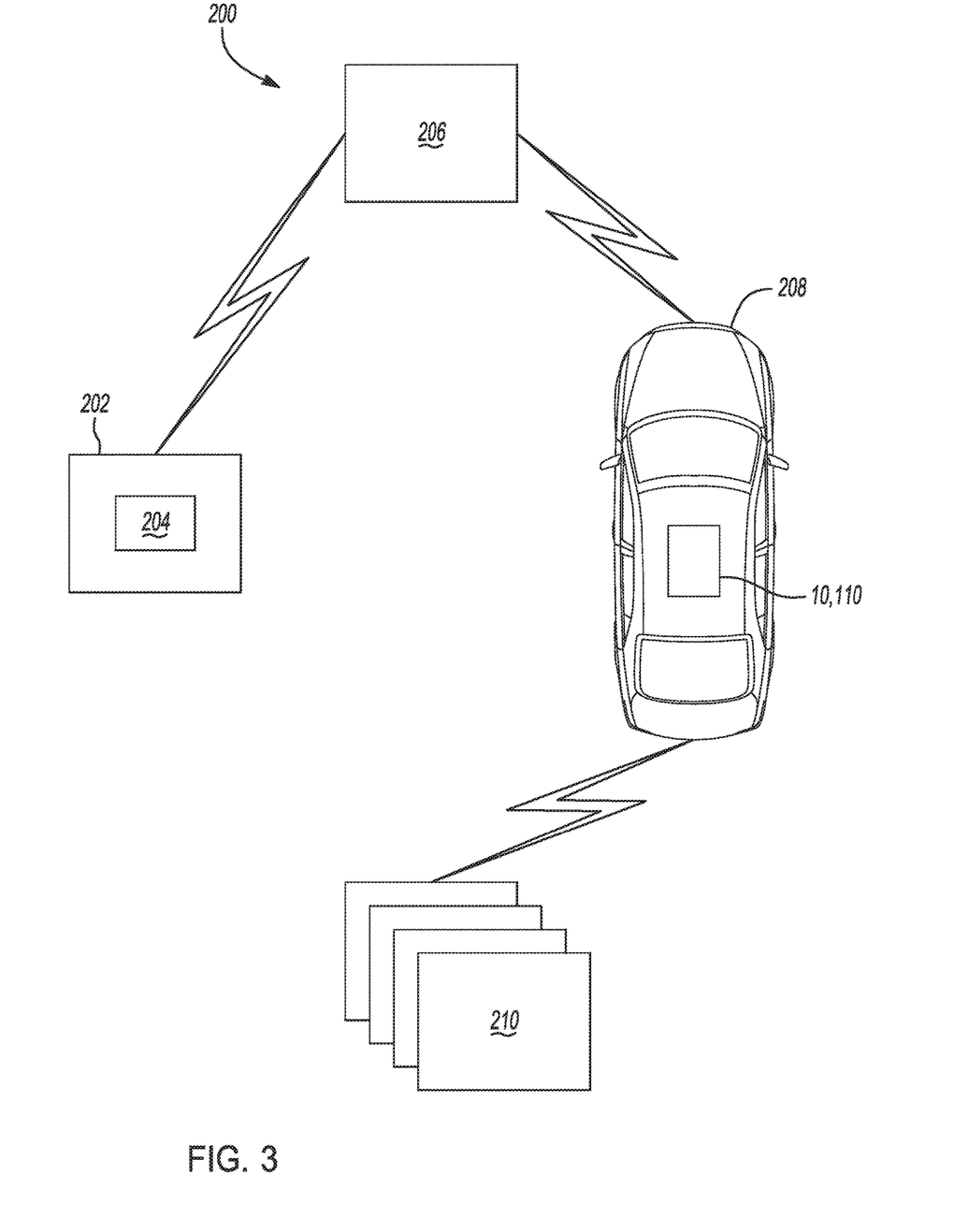
FIG. 3 is a diagram of a system for biometrically controlling access to motor vehicle functions according to the principles of the present disclosure.

Referring now to FIG. 3, and with continuing reference to FIGS. 1A-2C, in order to implement the use of a biometric control member 10, 110 within a motor vehicle, the motor vehicle operator(s) must create biometric reference data. System 200 depicts the flow of biometric data from enrollment to use in accordance with the present disclosure. System 200 includes an enrollment system 202 with an enrollment device 204 for generating a biometric template for at least one operator of a vehicle equipped with the biometric control member 10, 110 of this disclosure. The enrollment device 204 is a high definition, high resolution palm vein scanner. In one aspect, the at least one operator access the enrollment device 204 at a motor vehicle dealership. In another aspect, the operator may access the enrollment device 204 at home, at a motor vehicle production facility, etc. The enrollment device 204 generates a high definition, high resolution vein scan of at least one entire hand, including the palm, of the motor vehicle operator. The high definition, high resolution vein scan becomes the operator's biometric template.

The enrollment device 204 is in electronic communication with a remotely accessible electronic data storage location 206. In one aspect, the remotely accessible electronic data storage location 206 is a secure cloud storage location, or a secure, networked server storage location accessible via satellite communication, or other wireless communication system. The remotely accessible electronic data storage location 206 is also in electronic communication with the biometric control member 10, 110 of the motor vehicle. The operator's biometric template is associated with the operator's motor vehicle 208, and more particularly, with the biometric control member 10, 110 of the motor vehicle 208.

When the operator of the motor vehicle 208 manipulates the biometric control member 10, 110, the biometric sensor 28 disposed therein generates a partial palm vein scan of the portion of the operator's palm and sends the partial palm vein scan to the controller 38, 138. The controller 38, 138 compares the partial palm vein scan to the biometric templates associated with the motor vehicle, stored in the remotely accessible electronic data storage location 206 and based on the results of the comparison, the controller 38, 138 may allow a plurality of motor vehicle functions and/or V2X functions 208 to be accessed by the motor vehicle operator, and thereby associated with the motor vehicle operator's particular biometric template. Likewise, a similar plurality of motor vehicle functions and/or V2X functions are associated with the biometric template or templates corresponding to other users of the motor vehicle 208.

Figure 4:
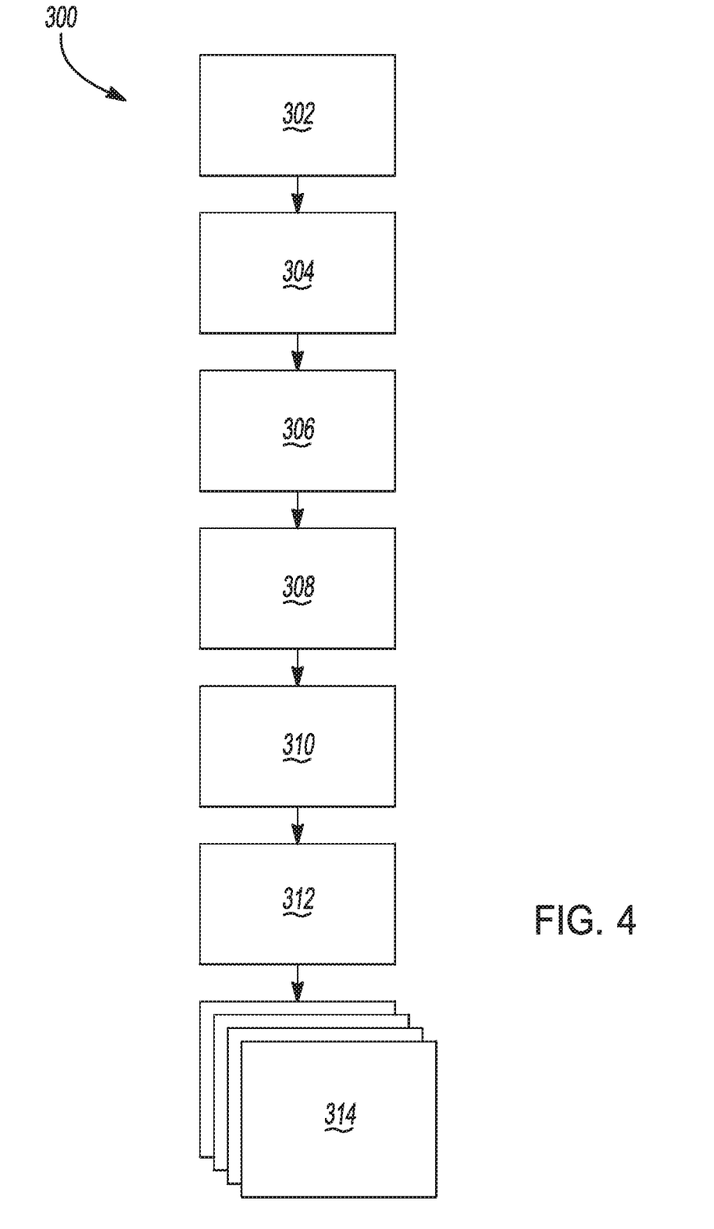
FIG. 4 is a system diagram illustrating a method for using a biometric control member according to the principles of the present disclosure.

Referring now to FIG. 4, and with continuing reference to FIGS. 1A-3, the method 300 begins at block 302 where an operator of a motor vehicle 208 having a biometric control member 10, 110 generates a biometric template using an enrollment device 204. As discussed previously, the biometric template is a high definition, high resolution vein scan of at least one entire hand, including the palm, of the motor vehicle operator. In one aspect, the motor vehicle operator accesses an enrollment device 204 to generate the biometric template.

At block 304, the biometric template is stored in the remotely accessible electronic data storage location 206, such as a cloud storage location, or a secure, networked server storage location.

At block 306 the biometric template is registered for use with the motor vehicle equipped with biometric control member 10, 110. The biometric template is thereby associated with the particular motor vehicle 208 that the operator will be utilizing.

At block 308 the operator of the motor vehicle 208 manipulates the biometric control member 10, 110 of the motor vehicle. Manipulation of biometric control members 10, 110 of FIGS. 1A-2C causes the operator to orient his or her hand such that at least a portion of the palm of the hand is at approximately distance "D" from and substantially parallel to the biometric sensor 28, 128.

At block 310, the biometric sensor 28, 128 creates a partial palm vein scan of the portion of the operator's palm that is oriented approximately at distance "D" from and substantially parallel to the biometric sensor 28, 128, and sends the partial palm vein scan to the controller 38, 138. In one aspect, the partial palm vein scan is a palm vein scan that is approximately 40 mm by 40 mm at distance "D" from the biometric sensor 28, 128. In another aspect, the partial palm vein scan measure approximately 100 mm by 100 mm at distance "D" from the biometric sensor 28, 128.

At block 312, the controller 38, 138 compares the partial palm vein scan to the biometric templates associated with the motor vehicle. At blocks 314, based on the results of the comparison, the controller 38 may allow a plurality of motor vehicle functions and/or V2X functions to be accessed by the motor vehicle operator, and thereby associated with the motor vehicle operator's particular biometric template. Likewise, a similar plurality of motor vehicle functions and/or V2X functions are associated with the biometric template or templates corresponding to other users of the motor vehicle 208.

It should be appreciated that while the system 200 and method 300 above primarily describe the generation, registration, and use of a single biometric template for a single operator and a single motor vehicle, additional operators may create biometric templates. Individualized operational characteristics for the motor vehicle may be associated with each operator of the vehicle. Furthermore, it should be understood that the same template or templates may be registered for use with multiple different motor vehicles so that each motor vehicle responds to a given motor vehicle operator according to, for example, the individualized operational characteristics previously noted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

The invention claimed is:

1. A biometric recognition system for a vehicle, the biometric recognition system comprising:
   a support portion;
   a vein reader sensor disposed on the support portion; and
   a control member configured to control a function of the vehicle, the control member having a top surface and a bottom surface and defining an opening extending through the control member from the top surface to the bottom surface, the control member moveable relative to the support portion to a first position, wherein the opening is aligned with the vein reader sensor and the top surface is a first distance from the vein reader sensor when the control member is in the first position, and the first distance is configured to optimize biometric verification of an operator's hand gripping the control member.

2. The biometric recognition system of claim 1 wherein the first distance between the operator's hand and the vein reader sensor is free from material.

3. The biometric recognition system of claim 1 wherein the first distance is approximately 70 mm.

4. The biometric recognition system of claim 1 wherein the opening is configured to allow the vein reader sensor to sense at least a portion of the operator's hand.

5. The biometric recognition system of claim 1 wherein the opening has a width and a length of at least 40 mm each.

6. The biometric recognition system of claim 5 wherein the vein reader sensor senses through the opening a biometric vein image of only a portion of the operator's hand on the control member.

7. The biometric recognition system of claim 1 wherein the control member includes a palm rest, and the opening is disposed in the palm rest.

8. The biometric recognition system of claim 7 wherein the palm rest comprises an elevated platform extending above and parallel to a plane defined by the vein reader sensor.

9. The biometric recognition system of claim 1 wherein the vein reader sensor is in communication with a controller having memory for storing a biometric template, and the controller is configured to compare the biometric vein image from the vein reader sensor to the biometric template to activate at least one function if the sensor data matches the biometric template.

10. The biometric recognition system of claim 9 wherein the function includes unlocking the control member to allow the control member to move to a second position.

11. The biometric recognition system of claim 9 wherein the function includes enabling an ignition of the vehicle.

12. The biometric recognition system of claim 9 wherein the function includes activating one or more operator preferences associated with the biometric template.

13. The biometric recognition system of claim 1 wherein the control member is a shifter, and wherein the shifter is translatable in a longitudinal direction between at least a Park position, a Neutral position, a Reverse position, and a Drive position, and the first position corresponds to the Park position.

14. A biometric recognition system for a vehicle, the biometric recognition system comprising:
   a control member having an outer surface with a tactile portion configured to be manipulated by an operator's hand, the tactile portion having an opening, wherein the control member is operable between a first position and a second position;
   a vein reader sensor disposed at a distance from the opening in the tactile portion when the control member is in the first position, wherein the vein reader sensor is aligned with the opening and senses a biometric vein image of a portion of the operator's hand on the tactile portion of the control member when in the first position, and the vein reader sensor is not aligned with the opening when in the second position; and
   a controller in communication with the vein reader sensor and having memory for storing a biometric template, wherein the controller is configured to compare the biometric vein image from the vein reader sensor to the biometric template to activate at least one function if the biometric vein image matches the biometric template.

15. The biometric recognition system of claim 14 wherein the vein reader sensor senses though the opening a biometric vein image of only a portion of the operator's hand on the tactile portion of the control member.

16. The biometric recognition system of claim 14 wherein the function includes unlocking the control member to allow the control member to move from the first position to the second position.

17. The biometric recognition system of claim 14 wherein the function includes enabling an ignition of the vehicle.

18. The biometric recognition system of claim 14 wherein the function includes activating one or more operator preferences associated with the biometric template.

19. The biometric recognition system of claim 14 wherein the function includes a V2X function.

20. A biometric system for use with a motor vehicle, the biometric system comprising:
   a biometric enrollment apparatus external to the motor vehicle, the biometric enrollment apparatus having a first vein reader sensor, the first vein reader sensor having a first scanning resolution and being in communication with a remotely accessible database for storing a biometric template of an operator's entire palm, a biometric recognition system in the motor vehicle and in communication with the remotely accessible database, the biometric recognition system comprising:

a control member having an outer surface with a tactile portion configured to be manipulated by an operator's hand, the tactile portion having an opening, wherein the control member is operable between a Park mode and a Drive mode;

a second vein reader sensor disposed at a distance from the opening in the tactile portion when the control member is in the Park mode, wherein the second vein reader sensor senses a biometric vein image of a portion of the operator's hand on the tactile portion of the control member; and a controller in communication with the second vein reader sensor and having memory for storing the biometric template, wherein the controller is configured to compare the biometric vein image from the second vein reader sensor to the biometric template to activate at least one function if the biometric vein image matches the biometric template, wherein the at least one function includes unlocking the control member body to allow the tactile portion to be operated, enabling an ignition of the vehicle, or activating one or more operator preferences associated with the biometric template.

21. The biometric recognition system of claim 1 wherein the control member is movable to a second position, wherein when the control member is in the second position the opening is not aligned with the vein reader sensor.

22. The biometric recognition system of claim 1 wherein the control member is movable to a second position, wherein when the control member is in the second position the top surface is a second distance from the vein reader sensor, and wherein the second distance is different than the first distance.

23. The biometric recognition system of claim 1 wherein the control member is a shift lever, and the shift lever is movable from the first position where the vein reader sensor performs a biometric verification of the operator's hand gripping the control member to a second position where the vein reader sensor does not perform a biometric verification of the operator's hand gripping the control portion.

* * * * *